(12) United States Patent
Spencer

(10) Patent No.: US 10,773,128 B1
(45) Date of Patent: Sep. 15, 2020

(54) INSECT REPELLING AND SCENTED GOLF BALL

(71) Applicant: Lawrence Spencer, Upper St. Clair, PA (US)

(72) Inventor: Lawrence Spencer, Upper St. Clair, PA (US)

( * ) Notice: Subject to any disclaimer, the term of this patent is extended or adjusted under 35 U.S.C. 154(b) by 0 days.

(21) Appl. No.: 16/579,372

(22) Filed: Sep. 23, 2019

(51) Int. Cl.
*A63B 37/00* (2006.01)
*A63B 57/10* (2015.01)
*A01M 29/12* (2011.01)

(52) U.S. Cl.
CPC ......... *A63B 37/0022* (2013.01); *A01M 29/12* (2013.01); *A63B 37/0024* (2013.01); *A63B 37/0076* (2013.01); *A63B 57/10* (2015.10); *A63B 2209/00* (2013.01)

(58) Field of Classification Search
CPC . A63B 37/0022; A63B 37/0024; A63B 57/10; A63B 2209/00; A63B 37/0076; A01M 29/12
USPC ................................. 473/165, 365, 378, 387
See application file for complete search history.

(56) References Cited

U.S. PATENT DOCUMENTS

| | | | |
|---|---|---|---|
| 7,699,713 B2 | 4/2010 | Chrisman, III | |
| 2004/0248673 A1* | 12/2004 | Breton | A63B 57/10 473/387 |
| 2007/0219019 A1* | 9/2007 | Matthews | A63B 37/0003 473/351 |
| 2008/0085783 A1* | 4/2008 | Isogawa | A61L 9/042 473/378 |
| 2011/0190077 A1* | 8/2011 | Sajima | A63B 37/12 473/378 |
| 2012/0035001 A1* | 2/2012 | Xie | A63B 37/0092 473/378 |
| 2014/0011610 A1* | 1/2014 | Caddell | C08L 101/16 473/377 |
| 2014/0057741 A1* | 2/2014 | Blazure | A63B 57/13 473/396 |

FOREIGN PATENT DOCUMENTS

KR 20090004304 A * 1/2009 ............. A63B 57/10

* cited by examiner

*Primary Examiner* — John E Simms, Jr.
(74) *Attorney, Agent, or Firm* — Sanchelima & Associates, P.A.; Christian Sanchelima; Jesus Sanchelima

(57) ABSTRACT

An insect repelling and scented golf ball including a golf ball assembly, and a golf tee assembly is disclosed herein. The golf ball assembly includes a golf ball having a core, intermediate layers, and an outer cover layer. The outer cover layer envelops the outer portion of the golf ball. This outer cover layer is embedded with an insect repellent to prevent insects from coining into contact with the golf ball. The golf ball additionally includes a paint layer that may further be imbedded with the insect repellent. The outer cover layer and the paint layer may also be embedded with a scented material to provide a user with pleasantly smelling golf balls. The golf tee assembly includes a golf tee having a tee outer cover layer and a tee paint layer that may also be embedded with an insect repellent or scented material.

11 Claims, 2 Drawing Sheets

INSECT REPELLING AND SCENTED GOLF BALL

BACKGROUND OF THE INVENTION

1. Field of the Invention

The present invention relates to a golf ball and, more particularly, to an insect repelling golf ball that deters and repels insects from coining into contact with a golf ball and additionally it relates to various adaptations to the golf ball which will provide a user with a variety of scents and aromas to the golf ball.

2. Description of the Related Art

Several designs for a golf ball have been designed in the past, none of them, however, include a golf ball made from a composition that includes an insect repellent material. The golf ball may include a core, intermediate layers, an outer cover layer and a paint layer. The outer layer may include the insect repellent for repelling bugs, ants, fleas, bees and other pests. Additionally, the golf ball may contain a scented material thereon. It is known that golf is a physically demanding and focus based sport that requires a significant amount of concentration from a player. It is also known when a player finds an insect on a golf ball or a golf tee it may disrupt the process of their swing causing them to swing poorly. Therefore, there is a need for a golf ball and a golf tee having an insect repelling material to prevent any insects from coining into contact with the golf ball and golf tee. Such a device will prevent the disruption of concentration for players of the sport.

Applicant believes that a related reference corresponds to U.S. Pat. (published application) No. issued to 7,699,713 for a bowling ball including a rubber material and at least one fragrance. The rubber material may be substantially nonporous and substantially rigid. Polyurethane may be used as the rubber material. The bowling ball may, optionally, include a pigment. A method by which the bowling ball is formed includes dissolving the fragrance in a polyol, adding a catalyst, introducing the mixture into a mold, and polymerizing the mixture. However, it differs from the present invention because the U.S. Pat. No. 7,699,713 reference fails to solve the issue of providing golf balls having an insect repelling material to aid golfers. The present invention addresses these issues by providing a golf ball and a golf tee having an insect repellent embedded within an outer cover layer or a painted layer. Additionally, the present invention aids in protecting the concentration of a golfer when attempting their swing.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an insect repelling golf ball to repel insects from coining into contact with the golf ball thereby reducing the disruption of the golfer. Additionally, the golf ball may also provide various aromas or scents.

It is another object of this invention to provide an insect repelling golf ball that simultaneously provides a user with a golf ball having various scents and aromas such as a cherry scent, a strawberry scent, a bourbon scent, or any other scent.

It is still another object of the present invention to provide a golf tee comprised of an insect repelling and scented composition to prevent insects from coining in contact with the golf tee providing an additional level of bug deterrent to the golf ball. Additionally, the golf tee may provide a user with a pleasantly smelling scent such as a cherry scent, a strawberry scent, a bourbon scent, or any other scent.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
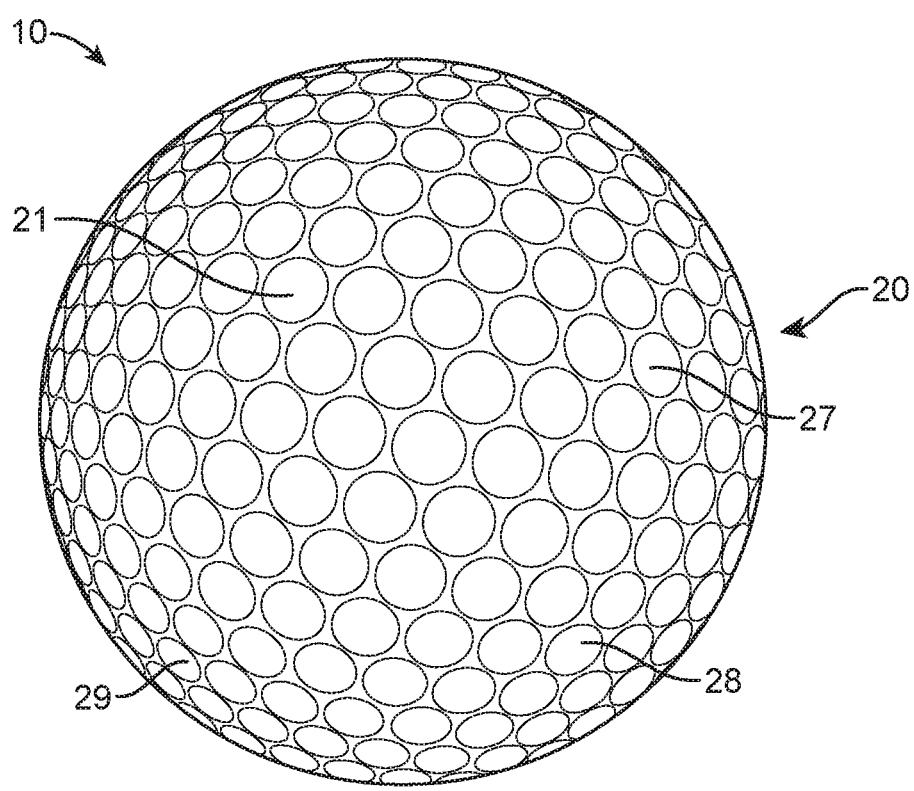
FIG. 1 represents an isometric view of an insect repelling and scented golf ball 10 in accordance to an embodiment of the present invention.
Figure 2:
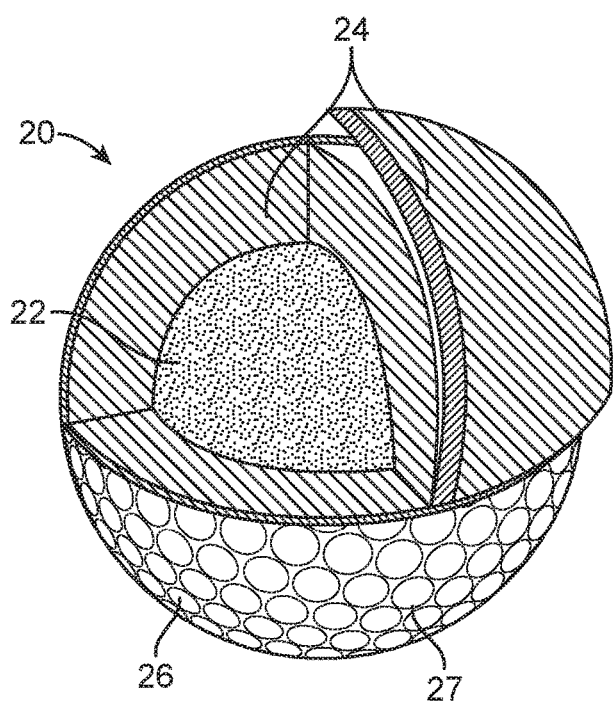
FIG. 2 shows an isometric view proving an internal view of golf ball assembly 20 in accordance to an embodiment of the present invention.
Figure 3:
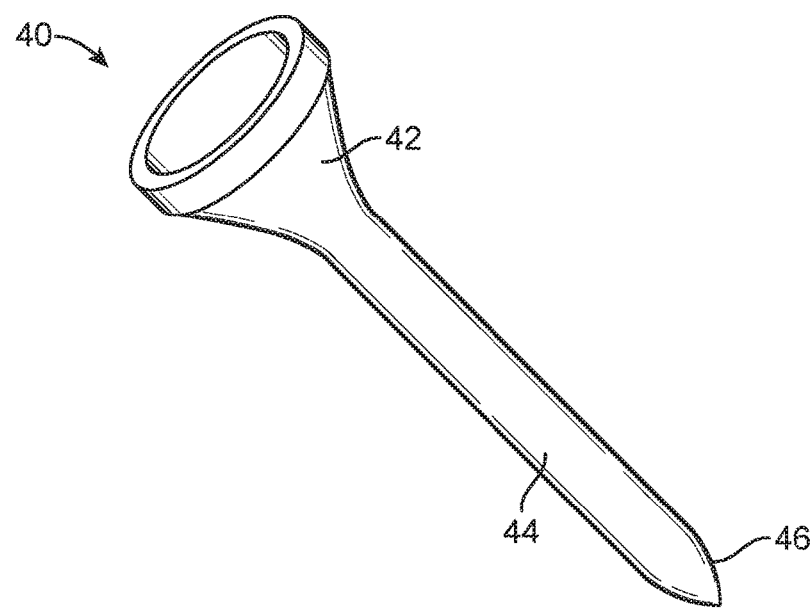
FIG. 3 illustrates an isometric view of golf tee assembly 40 in accordance with an embodiment of the present invention.

Referring now to the drawings, where the present invention is generally referred to with numeral 10, it can be observed an insect repelling and scented golf ball that basically includes a golf ball assembly 20 and a golf tee assembly 40.

Golf ball assembly 20 includes a golf ball 21 having a core 22, intermediate layers 24, and an outer cover layer 26. Core 22 is disposed in the center of golf ball 21. Core 22 may be of a solid or liquid core. It should be understood that core 22 may be made of any suitable material to aid in the playing of golf such as but not limited to rubber, plastic, and the like. Intermediate layers 24 are disposed surrounding core 22. Intermediate layer 24 comprises of a diameter greater than that of core 22 and envelops core 22. Intermediate layer 24 may additionally be made of any suitable material such as plastic, rubber, and the like. It should also be understood that any number of intermediate layers 24 may be included in golf ball 21. Outer cover layer 26 envelops intermediate layers 24. Additionally, outer cover layer 26 may be made of any suitable material such as plastic, rubber, and the like and comprise of a diameter greater than that of intermediate layers 24. Additionally, core 22, intermediate layers 24, and outer cover layer 26 may be made of compositions such as but not limited to polybutadiene, Ionomer, urethane elastomer, and fusablend. Golf ball 21 may further include a paint layer 27. Paint layer 27 may comprise of a paint material configured to be applied to outer cover layer 26. In one embodiment paint layer 27 envelops the entirety of outer cover layer. In another embodiment, paint layer 27 may be used to apply indicia thereon to outer cover layer 26. Outer cover layer 26 is embedded with an insect repelling material 28. In the present embodiment, insect repelling material 28 is embedded within outer cover layer 26 to provide a user with maximum repellent protection from insects. In another embodiment of the present invention, paint layer 27 may additionally be embedded with insect repelling material 28. It should also be understood that an additional embodiment may include outer cover layer 26 and paint layer 27 having insect repelling material 28 embedded therein. Insect repelling material 28 provides golf ball 21 with protection against insects such as bugs, ants, flees, bees, and other pests that may disrupt the concentration of an individual playing the sport.

In one embodiment of the present invention, outer cover layer 26 and paint layer 27 may further be embedded with a scented material 29. Scented material 29 is provided as an integral part of outer cover layer 26 or paint layer 27. Additionally, scented material 29 provides a user with a pleasantly smelling scent that may include but not limited to cherry, strawberry, bourbon. It should be understood that scented material 29 may be configured to any desired scent of a user. In one embodiment of the present invention, scented material 29 is provided on golf ball assembly 20 absent of insect repelling material 28. In yet another embodiment of the present invention, insect repelling material 28 is provided absent of scented material 29 on golf ball assembly 20. In yet another embodiment of the present invention, scented material 29 is provided in conjunction with insect repelling material on golf ball assembly 20.

Golf tee assembly 40 includes a golf tee 42 having tee outer cover layer 44 and tee paint layer 46. Golf tee 42 may be made of any suitable material such as rubber, plastic, and the like. Furthermore, golf tee 42 may comprise of a shape tapering inwardly as known in the art. Golf ball 21 rests on golf tee 42. Additionally, tee outer cover layer 44 may be made of any suitable material such as plastic, rubber, and the like. Tee paint layer 46 may cover tee outer cover layer 44 entirely in one embodiment of the present invention. Tee paint layer 46 may also come in the form of indicia disposed on tee outer cover layer 44. Tee outer cover layer 44 further includes insect repelling material 28 embedded therein. This configuration repels any insects from coining into contact with golf tee 42. In another embodiment, tee paint layer 46 additionally includes insect repelling material 28 to further aid golf tee 42 in being protected against insects. Tee outer cover layer 44 and tee paint layer 46 may additionally include scented material 29. Scented material 29 is configured to be a pleasantly smelling aroma for a user that may include but not limited to cherry, strawberry, bourbon.

In the present invention, the design and production of the insect repellent golf ball will strictly adhere to the USGA (United States Golf Association) specifications.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an insect repelling and scented golf ball, comprising:
   a. a golf ball assembly, including a golf ball having a core, intermediate layers and an outer cover layer, wherein said core is a liquid core, a paint layer applied to said outer cover layer or said intermediate layers, and an insect repelling material, said outer cover layer being embedded with said insect repelling material, wherein said insect repelling material is diethyltoluamide (DEET).

2. The system for an insect repelling and scented golf ball of claim 1 wherein said paint layer is embedded with said insect repelling material.

3. The system for an insect repelling and scented golf ball of claim 1 wherein said paint layer is embedded with a scented material.

4. The system for an insect repelling and scented golf ball of claim 1 which further includes a golf tee assembly, including a golf tee having a tee outer cover later, wherein said tee outer cover layer is embedded with said insect repelling material.

5. The system for an insect repelling and scented golf ball of claim 4 wherein said golf tee further includes a tee paint layer.

6. The system for an insect repelling and scented golf ball of claim 5 wherein said tee paint layer is embedded with said insect repelling material.

7. The system for an insect repelling and scented golf ball of claim 5 wherein said tee paint layer is embedded with a scented material.

8. The system for an insect repelling and scented golf ball of claim 4 wherein said tee outer cover layer is embedded with a scented material.

9. The system for an insect repelling and scented golf ball of claim 1 wherein said outer cover layer is embedded with a scented material.

10. A device for an insect repelling and scented golf ball, comprising:
   a. a golf ball assembly, including a golf ball having a liquid core, intermediate layers and an outer cover layer, said outer cover layer being embedded with an insect repelling material, wherein said insect repelling material is diethyltoluamide (DEET), wherein said golf ball further includes a paint layer being embedded with said insect repelling material, said outer layer cover and said paint layer further including a scented material; and
   b. a golf tee assembly, including a golf tee having a tee outer cover layer, wherein said tee outer cover layer is embedded with said insect repelling material, wherein said golf tee further includes a tee paint layer being embedded with said insect repelling material, wherein said tee outer cover layer and said tee paint layer further include a scented material.

11. A system for an insect repelling and scented golf ball, comprising:
   a. a golf ball assembly including a golf ball having a liquid core, intermediate layers, an outer cover layer, a paint layer applied to said outer cover layer or said intermediate layers, and an insect repellant material, said outer cover layer or said intermediate layers or said paint layer being embedded with an insect repelling material being DEET;
   b. a scent layer applied to each of said core, said intermediate layers, said outer cover layer, and said paint later; and
   c. a golf tee assembly, including a golf tee having a tee outer cover layer, wherein said tee outer cover layer is embedded with said insect repelling material.

* * * * *